INVENTOR
MAX PEEK
BY Robert Harding Jr.
ATTORNEY

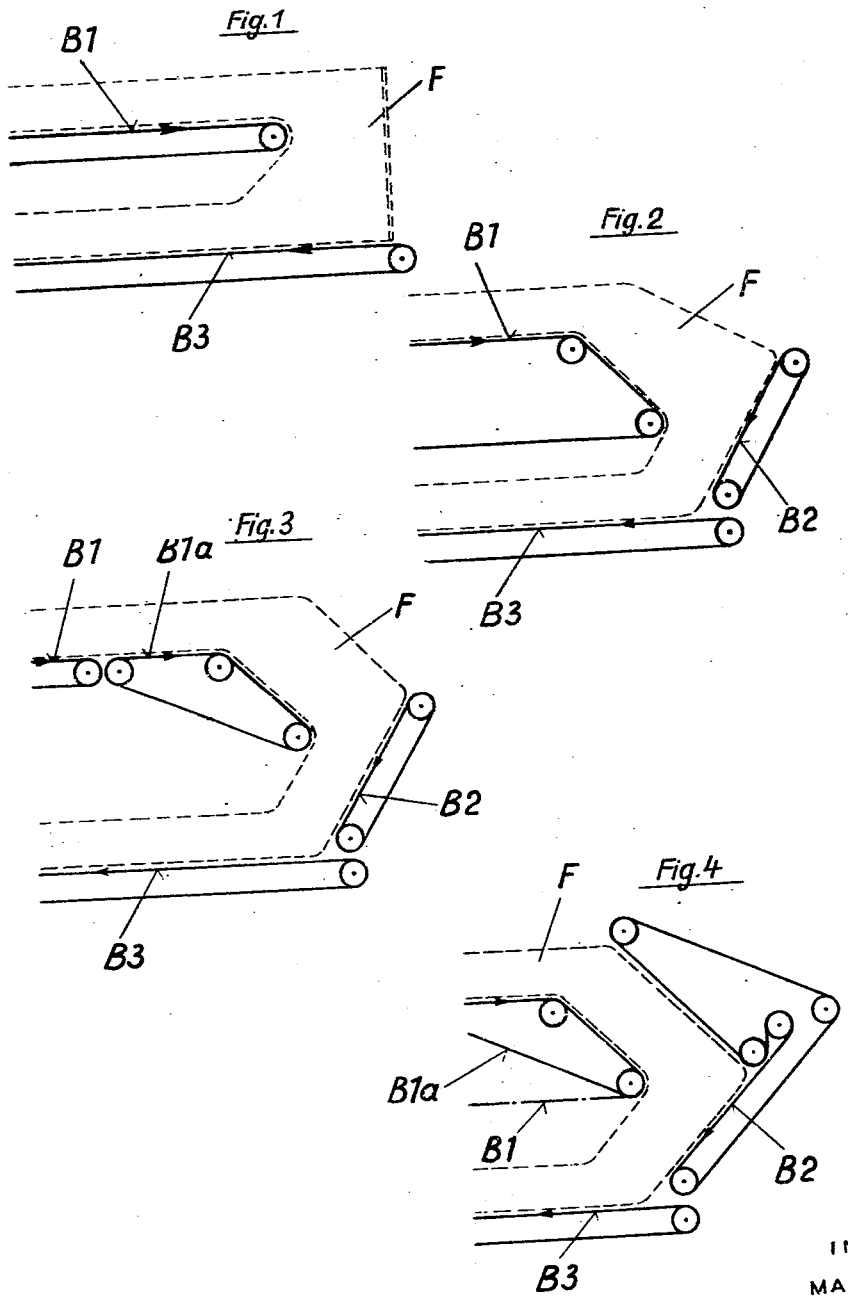

United States Patent Office 2,799,385
Patented July 16, 1957

2,799,385

ON-EDGE CONVEYOR SYSTEM, PARTICULARLY FOR THE DISTRIBUTION OF FLAT OBJECTS, SUCH AS LETTERS OR POSTCARDS

Max Peek, Darmstadt, Germany, assignor to Mix & Genest Aktiengesellschaft, Stuttgart-Zuffenhausen, Germany, a corporation of Germany Application November 22, 1952, Serial No. 321,968

Claims priority, application Germany December 4, 1951

6 Claims. (Cl. 198—84)

Distribution systems for on-edge conveyed letters and postcards or similar flat objects are known in which the dispatch articles are being moved along in a stationary slideway, formed e. g. of narrow vertical sheet metal walls, by means of a flat belt running alongside below the slideway, and in which these dispatch articles are sorted out according to the different dispatch directions and branched off to the corresponding piling points which are arranged behind each other to the left or the right or the conveying belt, or else are led to other, similarly constructed, adjoining distribution channels. The inserting and sending points of the distribution system are arranged in the conventional embodiments at a horizontal on-edge conveying belt near the receiving points in such a manner that these types of distribution systems are featured by a considerable building length. This length is due to the fact that the working positions for the operators involved in the distribution process on the one hand occupy the space, alongside the distribution system, which is required for the necessary operating movements and are arranged in one row next to each other and, on the other hand, that the space, required for the branching off of the distributed dispatch articles, is arranged adjacent to the belt system. On account of this great space requirement these types of on-edge distribution systems have only been installed to a small extent hitherto.

The on-edge distribution system according to the present invention avoids the drawback of the great building length and is characterized in that at least 2 on-edge distributing belts or belt sections are arranged in the room below each other with an opposite conveying direction and that each one of the guiding slideways which is attached above the belt section is joined to the one next below in a way that the dispatch articles which had been first of all conveyed in the upper slideway system, change over at the end of the belt section, by means of correspondingly shaped guiding channels, into each time the associated lower system, by which the articles are conveyed further in the backward direction to the receiving points arranged in different distances from the end of the belt section either to the right and/or the left of the conveying direction, and are branched off into e. g. collecting boxes or falling shafts.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic diagram of a pair of stacked oppositely driven horizontal conveyor belts;

Fig. 2 is a schematic diagram of my invention showing a pair of stacked oppositely driven belts, and a third guide belt at an angle to the pair of belts;

Fig. 3 is a schematic diagram of another embodiment of my invention showing an arrangement similar to the structure of Fig. 2 but with an auxiliary belt adjacent the discharge end of the upper horizontal belt;

Fig. 4 is a schematic diagram of a further embodiment of my invention as shown in Figs. 2 and 3, with the third guide belt adapted to guide objects in two directions;

Figure 5:
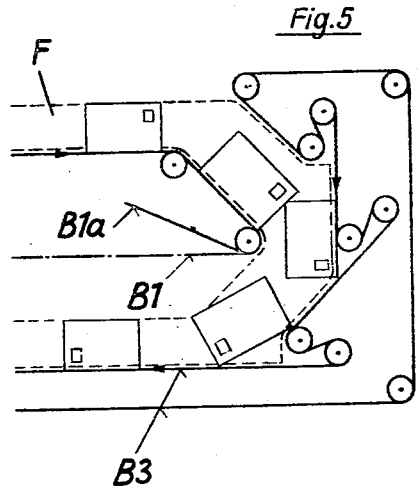
Fig. 5 is a schematic diagram of a modification of the structure of Fig. 4, with the third guide belt adapted to guide objects in three directions.

Referring now to Fig. 1, there is shown schematically a pair of oppositely driven conveyor belts B1, B3, spacedly stacked from each other with a guide channel F communicating between the discharge end of belt B1 and the receiving end of belt B3. An article discharged from belt B1 is guided to belt B3 by the guide channel F.

For the purpose of placing the dispatch articles at the receiving points always in the same position and reading direction, and for preventing an undesirable turning of the letters or postcards during their free fall between the upper and the lower conveying belt, it is convenient to lead the end of the upper belt section B1 slantingly downwards by an angle of approximately 45° and to provide the conveyed dispatch articles, with the aid of the conveying belt B1, with such a projectile speed that they meet with an active force onto the conveying belt B2 likewise proceding slantingly downwards with an opposite horizontal component, whereby the dispatch articles are taken along with their impacting short edge by the belt B2 owing to the force which is due to the friction, and rest with their long edge against the transporting conveying belt B2, thus being conveyed also now with the previously forward-directed letter-edge in the forward direction, and are thereby turned. The corresponding embodiment is shown in Fig. 2.

In order to provide the end of the belt section, independently of the velocity of the horizontally proceeding conveying belt B1, with a suitable speed corresponding to the process described above, it may also be convenient to design the end of the horizontal belt section B1 according to Fig. 3, as a separate conveying belt B1a, the driving speed of which is separately adjustable.

Furthermore it may be of advantage in several other cases to choose the conveying speed of the belt B1 to be so high as to prevent dispatch articles, which are thrown in by several other inserting points into the same slideway system, from coming to lie next to each other and thus, perhaps owing to their greater common thickness, are likely to be clamped in the slideway and block the regular sequence of the distribution process. When exceeding a certain speed, thereby, the dispatch articles leaving the end of the belt section, are lifted from the slantingly downward proceeding end of the conveying belt B1 or B1a, respectively, and the intended turning of the dispatch articles is not accomplished owing to the free fall. In the embodiment according to Fig. 4 the conveying belt B2 is redirected for this purpose in such a manner by way of rollers, that besides the slantingly downward proceeding part, on which it carries the dispatch articles, there is provided at least one part, proceeding slantingly downwards, approximately in the same manner as the descending end of the belt section B1 or B1a, but which is designed to lead the dispatch articles downwards, so that these are forced to join in the change of direction and the turning. For obtaining a better survey of the regular passing through of the dispatch articles and for the removal of jammings it may be of advantage to construct the overhanging part of the conveying belt B2 to be hinged down.

Fig. 5 shows another type of embodiment of the invention in which the conveying belt section, taking up the dispatch articles and proceeding slantingly downwards with a horizontal component being opposite to the belt section B1, is formed by means of by-pass rollers out of the conveying belt B3.

In a further example of embodiment according to Fig. 6 the dispatch articles are being turned into the opposite direction by means of an immovable edge K, proceeding transversely through all dropping-slideways, and which is attached below the impacting point of the letters or postcards with a small space above the conveying belt B2. Said edge may consist, for instance, of a piece of round steel or of a narrow angle of sheet metal. This round bar or sheet angle is arranged in a way not hindering the free running of the conveying belt B2. If a flat object, coming fom the end of the upper conveying belt section B1 or B1a, respectively, meets onto the conveying belt B2, and if the latter is inclined sufficiently strong for performing the turning procedure, then the center of gravity of the dispatch article will project, after the article has hit the fixed edge K on belt section B2, over the said edge K and effects in this way on account of the couple of forces created in this moment (force of application—force of gravity) the turning of the dispatch article, so that the edge of the letter or the postcard which, at first on the belt section B1 had been lying in front, will now be lying behind on the belt sections B2 and B3. In the practical operation it is only essential for the purpose of saving time, that all dispatched articles can be read at the receiving point from the same viewing direction, which may be readily achieved by either method.

Figure 6:
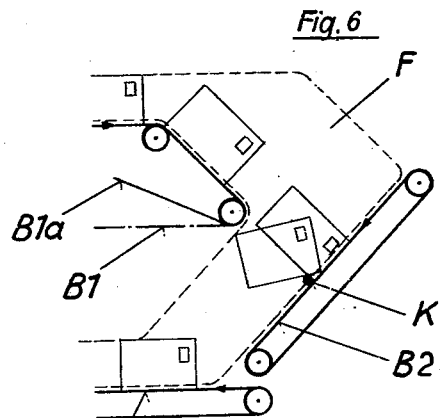
Fig. 6 is a schematic diagram of another embodiment of my invention as shown in Fig. 2, showing a fixed stop extending across the third guide belt.
Figure 7:
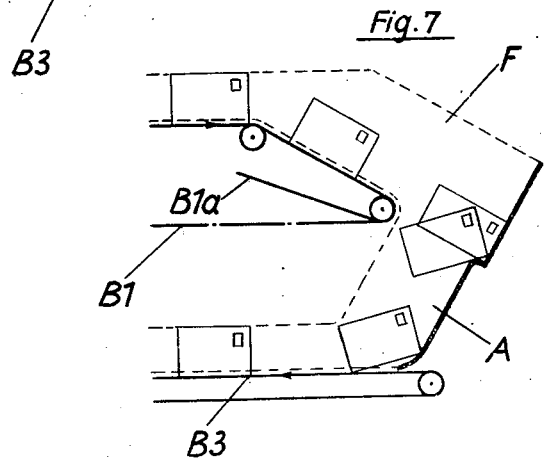
Fig. 7 is a schematic diagram of a modification of the structure of Fig. 6 and shows an immovable guide surface extending at an angle to the pair of belts.

Fig. 7 is a schematic diagram of a modification of the structure shown in Fig. 6 and utilizes a fixed slide surface A which is disposed adjacent the discharge end of belts B1, B1a at a downwardly slanting angle from the main or horizontal portion of belt B1. There is further provided a shoulder in the slide surface which performs a function similar to that performed by the stop K in Fig. 6, namely, to cause the dispatch articles to rotate ninety (90°) degrees due to the pull of gravity on the part of the dispatch article which is distant from the slide surface.

What is claimed is:

1. A high speed on-edge conveying and distribution system, particularly for the distribution of flat objects such as letters or postcards comprising a pair of parallel conveyor belts lying in separate planes one above the other adapted to travel in directions opposite to each other, each belt having a main portion, a feed end and a discharge end, the lower of said belts positioned to receive conveyed objects from the upper of said belts, fixed lateral guide means for maintaining conveyed objects on edge during conveyance on said belts, the discharge end of said upper belt extending in a first direction at a first substantially downwardly slanting angle from the main portion of said upper belt, downward object-guiding means disposed adjacent the discharge end of said upper belt extending in a second direction at a second substantially downwardly slanting angle from the main portion of said upper belt, said second direction opposite said first direction, the main portion and the discharge end of said upper belt adapted to carry the conveyed objects on a first edge, said downward object-guiding means adapted to carry the conveyed objects on a second edge perpendicular to said first edge and to deposit the objects on the feed end of said lower belt in a position whereby said lower belt is adapted to re-carry said objects on said first edge.

2. An on-edge conveying end distribution system as claimed in claim 1, wherein said downward object-guiding means comprises a third conveyor belt travelling in said second direction.

3. An on-edge conveying and distribution system as claimed in claim 1, wherein said downward object-guiding means comprises a third conveyor belt having a first portion travelling in a third direction parallel to the direction of travel of the discharge end of said upper belt and having a second portion travelling in said second direction.

4. An on-edge conveying and distributing system as claimed in claim 1, wherein said downward object guiding means comprises a third conveyor belt having three portions, a first portion thereof travelling in a third direction parallel to the direction of travel of the discharge end of said upper belt, a second portion thereof travelling in a fourth direction substantially normal to the direction of travel of the main portion of said upper belt, and a third portion thereof travelling in said second direction.

5. An on-edge conveying and distribution system as claimed in claim 2, further comprising a fixed stop associated with said third belt, said stop disposed above said third belt at a point therealong just below the point of impact of objects discharged from the discharge end of said upper belt.

6. An on-edge conveying and distribution system as claimed in claim 1, wherein said downward object-guiding means comprises a fixed slideway having a ledge intermediate the ends thereof and just below the point of impact of objects discharged from the adjacent end portion of said upper belt, whereby said ledge acts on an edge of a conveyed object to rotate said object a predetermined angular distance for proper positioning thereof on said lower belt.

References Cited in the file of this patent

UNITED STATES PATENTS

| 1,297,926 | Starr | Mar. 18, 1919 |
| 1,578,617 | Houten | Mar. 30, 1926 |
| 2,100,585 | Bearsley | Dec. 31, 1931 |
| 2,604,972 | Schmied | July 29, 1952 |
| 2,605,883 | Thames | Aug. 5, 1952 |

FOREIGN PATENTS

| 530,362 | Germany | July 28, 1931 |